United States Patent
Miyazaki (10) Patent No.: US 7,424,220 B2
(45) Date of Patent: Sep. 9, 2008

(54) OPTICAL TRANSMISSION SYSTEM WITH TWO-MODE RING PROTECTION MECHANISM FOR PRIORITIZED CLIENT SIGNALS

(75) Inventor: Keiji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 579 days.

(21) Appl. No.: 11/024,684

(22) Filed: Dec. 30, 2004

(65) Prior Publication Data
US 2006/0013584 A1  Jan. 19, 2006

(30) Foreign Application Priority Data
Jul. 15, 2004  (JP)  ............... 2004-208237

(51) Int. Cl.
H04B 10/08  (2006.01)
H04B 10/20  (2006.01)
H04J 14/00  (2006.01)
H04J 14/02  (2006.01)

(52) U.S. Cl. .......................... 398/19; 398/79
(58) Field of Classification Search ............ 398/79, 398/19
See application file for complete search history.

(56) References Cited

U.S. PATENT DOCUMENTS 5,999,288 A * 12/1999 Ellinas et al. ............. 398/59
6,414,765 B1 * 7/2002 Li et al. .................... 398/5
6,657,952 B1 * 12/2003 Shiragaki et al. .......... 370/223
6,959,151 B1 * 10/2005 Cotter et al. ............... 398/54

FOREIGN PATENT DOCUMENTS

JP  11-266201 A  9/1999
JP  2001-217776 A  8/2001
JP  2003-244072 A  8/2003

* cited by examiner

Primary Examiner—Jason Chan
Assistant Examiner—Danny W Leung
(74) Attorney, Agent, or Firm—Hanify & King P.C.

(57) ABSTRACT

An optical transmission system that offers more efficient bandwidth usage in normal operation, as well as enhanced fault tolerance for higher service availability. A transponder converts high-priority and low-priority client signals into high-priority and low-priority wavelength signals to be added to network traffic. An optical switch fabric normally delivers high-priority and low-priority wavelength signals to high-priority and low-priority paths, respectively, where the two paths run in opposite directions. Such signals and paths are prioritized in terms of survivability against network failure. In case of a network failure, the optical switch fabric performs protection switching in either duplicate switching mode or path switchover mode depending on network failure information and drop wavelengths of each optical transmission device. In duplicate switching mode, high-priority wavelength signals are directed to both the high-priority and low-priority paths. In path switchover mode, they are routed to the low-priority path, instead of the high-priority path.

8 Claims, 12 Drawing Sheets

T1 LOCAL WAVELENGTH TABLE

| CHANNEL NUMBER | WAVELENGTH VARIABILITY | WAVELENGTH | WAVELENGTH NUMBER | OPERATING STATUS |
|---|---|---|---|---|
| 1 | FIXED | 1511 nm | 12 | WORKING |
| 2 | FIXED | 1515 nm | 14 | STANDBY |
| 3 | VARIABLE | 1519 nm | 16 | WORKING |

A1 points to row 1.

FIG. 3

T2 RING WAVELENGTH TABLE

|   | NODE ID | WAVELENGTH | WAVELENGTH NUMBER | OPERATING STATUS |
|---|---------|------------|-------------------|------------------|
| A2 | N1 | 1511 nm | 12 | WORKING |
|   | N2 | 1515 nm | 14 | STANDBY |
|   | N3 | 1519 nm | 16 | WORKING |

M1 FAILED WAVELENGTH MAP

| FAILURE POINT | FAILED WAVELENGTH |
|---|---|
| L1a | $\lambda 1$ |
| N2 | $\lambda 2$ |
| L1b | $\lambda 1, \lambda 2$ |
| N3 | $\lambda 3$ |
| L1c | $\lambda 1, \lambda 2, \lambda 3$ |
| N4 | $\lambda 4$ |
| L1d | $\lambda 1, \lambda 2, \lambda 3, \lambda 4$ |

FIG. 7

T3 DROP WAVELENGTH TABLE

| PATH ID | WAVELENGTH NUMBER | WAVELENGTH | DROP NODE |
|---|---|---|---|
| 101 | 1 ($\lambda$1) | 1510nm | N2, N3 |
| | | | |

FIG. 8

T4 SWITCHING MODE TABLE

| FAILURE POINT | SWITCHING MODE |
|---|---|
| L1a | PATH SWITCHOVER |
| N2 | NO SWITCHING |
| L1b | DUPLICATE SWITCHING |
| N3 | NO SWITCHING |
| L1c | NO SWITCHING |
| N4 | NO SWITCHING |
| L1d | NO SWITCHING |

OPTICAL TRANSMISSION SYSTEM WITH TWO-MODE RING PROTECTION MECHANISM FOR PRIORITIZED CLIENT SIGNALS

CROSS-REFERENCE TO RELATED APPLICATIONS

This application is based upon and claims the benefits of priority from the prior Japanese Patent Application No. 2004-208237, filed on Jul. 15, 2004, the entire contents of which are incorporated herein by reference.

BACKGROUND OF THE INVENTION

1. Field of the Invention

The present invention relates to an optical transmission system, and more particularly to an optical transmission system that transports optical signals with optical wavelength-division multiplexing (WDM) techniques.

2. Description of the Related Art

WDM technology enables many transmission signals to be carried over a single fiber-optic medium, assigning different optical wavelengths to different communication channels. Recent years have seen a remarkable progress in development of WDM networks as a key technology for data communication infrastructures. A widely used WDM backbone structure is ring network systems, which is formed from a plurality of WDM nodes interconnected in a ring topology. In such a WDM ring system, each node functions as an optical add/drop multiplexer (OADM), which drops (removes) and adds (inserts) optical signals with particular wavelengths from/to the multi-channel backbone traffic. Nodes are linked by two or more parallel fiber cables so that one signal path can be replaced with another path in case of failure in the WDM ring network.

Figure 11:
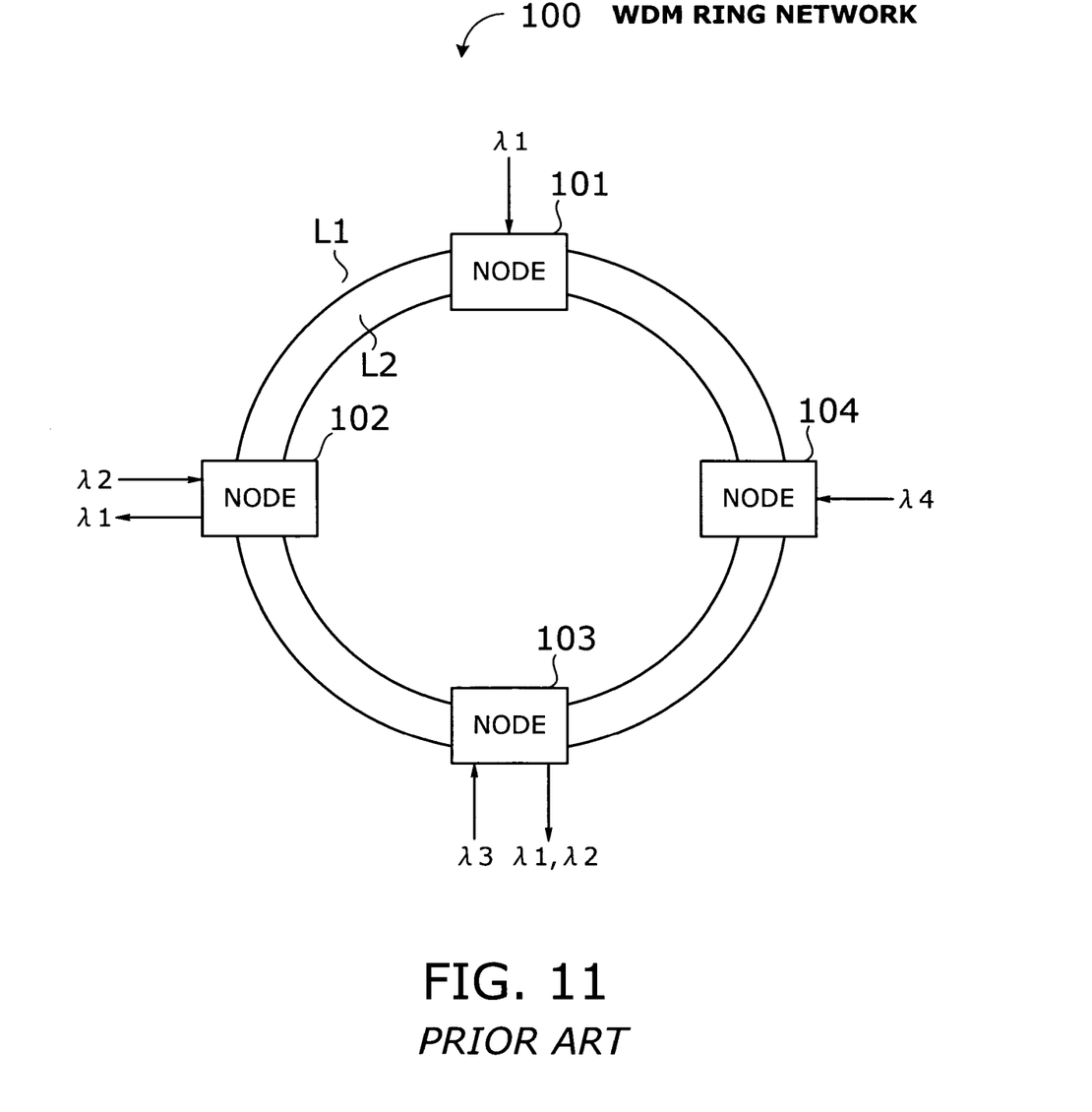
FIG. 11 shows how OADMs operate in a WDM system.

FIG. 11 shows how OADMs operate in a WDM system. The illustrated WDM ring network 100 involves four nodes 101 to 104 interconnected by optical transmission lines L1 and L2 in a dual ring topology. Wavelengths λ1 to λ4 are added at the nodes 101 to 104, respectively. The WDM signal on the ring contains those wavelength components λ1 to λ4, and the nodes 101 to 104 can drop any desired wavelength component out of the WDM signal circulating along the ring. In the present example, a wavelength λ1 is dropped at one node 102, while wavelengths λ1 and λ2 are dropped at another node 103. Notice that the same wavelength λ1 is dropped at two different nodes 102 and 103. This type of ring structure is called multidrop configuration.

Figure 12:
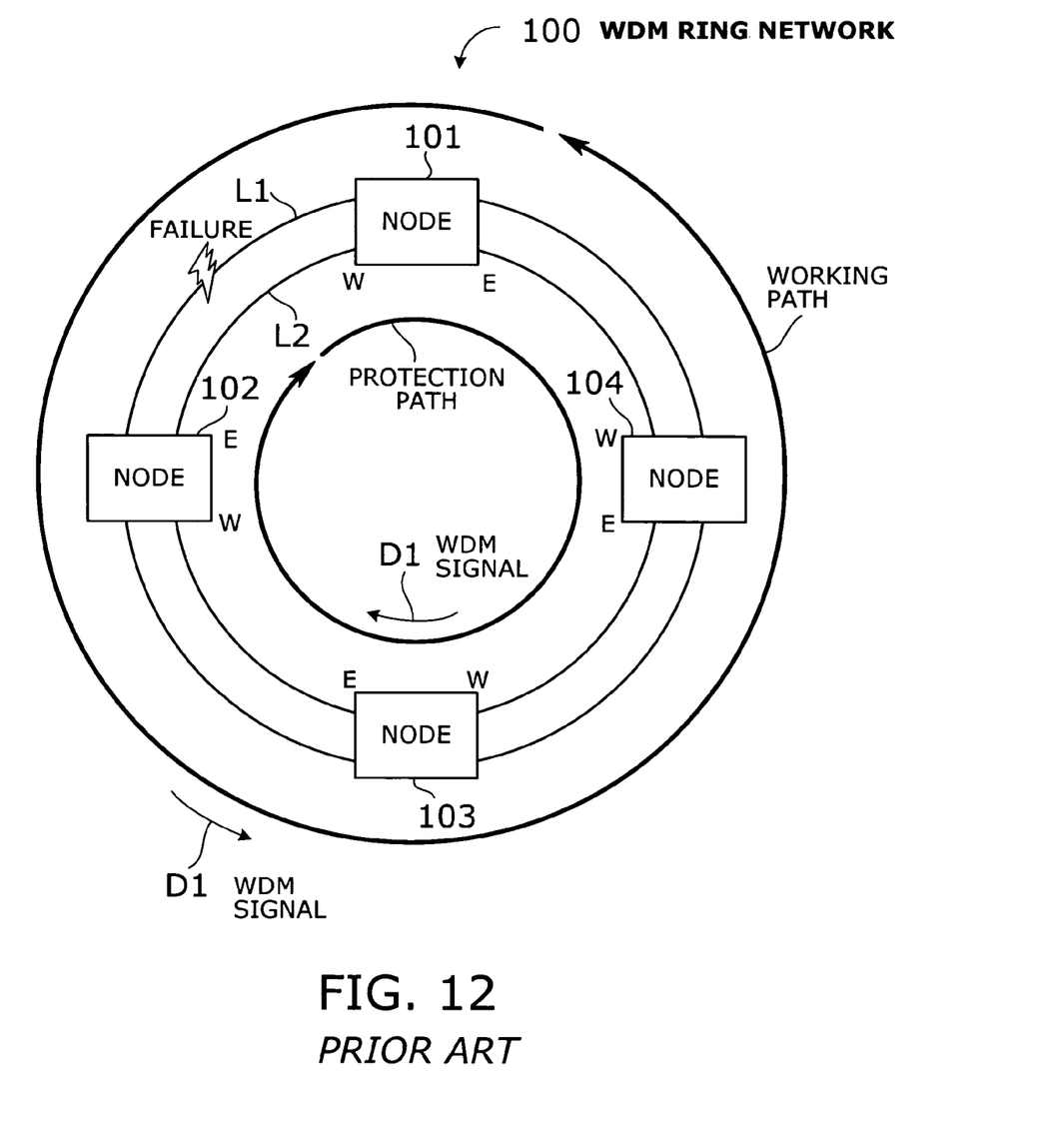
FIG. 12 shows failover in a WDM ring network system.

FIG. 12 shows failover in the WDM ring network 100. The first line L1 running in the counterclockwise direction is used as a working path, and the second line L2 running in the clockwise direction is used as a protection path. Both the working path and protection path convey all four wavelengths λ1 to λ4 to deliver the same service data. This signal is referred to as WDM signal D1.

Suppose now that the working line L1a has encountered a link failure at a point between nodes 101 and 102 during normal operation. To recover from the failure, the system switches the working path from the current line L1 to the other line L2, the latter having been assigned as a protection path. The new working path circumvents the failure of line L1, thus enabling the system to continue its service.

The WDM ring network 100 has multidrop capabilities and takes a non-revertive "1+1" switching architecture. Since this protection system always assigns two paths to carry the same service signals in preparation for a possible link failure, the actual usage of bandwidth is at most 50 percent even in normal operation, failing to use the full available network capacity efficiently.

Some researchers propose a transmission device for a WDM dual-ring network with protection switching functions. See, for example, Japanese Patent Application Publication No. 2003-244072, paragraphs 0020 to 0025, FIG. 1. The proposed device has two output interfaces disposed between add/drop multiplexer modules with a switch circuit. When a path failure occurs, the decision of which output interface to use is made on the basis of destinations of user data and the information about that failure. This device, however, lacks consideration for the bandwidth usage in normal situations.

SUMMARY OF THE INVENTION

In view of the foregoing, it is an object of the present invention to provide an optical transmission system that offers more efficient bandwidth usage in normal operation, as well as enhanced fault tolerance for higher service availability.

To accomplish the above object, the present invention provides an optical transmission system transporting optical signals over a ring network with WDM techniques. This system has a plurality of optical transmission devices interconnected by transmission media in a ring topology. Each optical transmission device includes a transponder that converts a high-priority client signal and a low-priority client signal into a high-priority wavelength signal and a low-priority wavelength signal to be added to network traffic. Also included in each optical transmission device are a device manager and an optical switch fabric. The device manager manages network failure information and lightpath information of the ring network. The optical switch fabric normally delivers the high-priority wavelength signal to a high-priority path and the low-priority wavelength signal to a low-priority path running in an opposite direction to the high-priority path. The high-priority client signals, high-priority wavelength signals, and high-priority path have higher priority than the low-priority client signals, low-priority wavelength signals, and low-priority path, respectively, in terms of survivability against network failure. When a network failure is encountered, the optical switch fabric performs protection switching in either duplicate switching mode or path switchover mode depending on the network failure information and drop wavelengths of each optical transmission device. In duplicate switching mode, the optical switch fabric directs the high-priority wavelength signals to both the high-priority and low-priority paths. In path switchover mode, it directs the high-priority wavelength signals to the low-priority path, instead of the high-priority path.

The above and other objects, features and advantages of the present invention will become apparent from the following description when taken in conjunction with the accompanying drawings which illustrate preferred embodiments of the present invention by way of example.

DESCRIPTION OF THE PREFERRED
EMBODIMENTS

Preferred embodiments of the present invention will be described below with reference to the accompanying drawings, wherein like reference numerals refer to like elements throughout.

Figure 1:
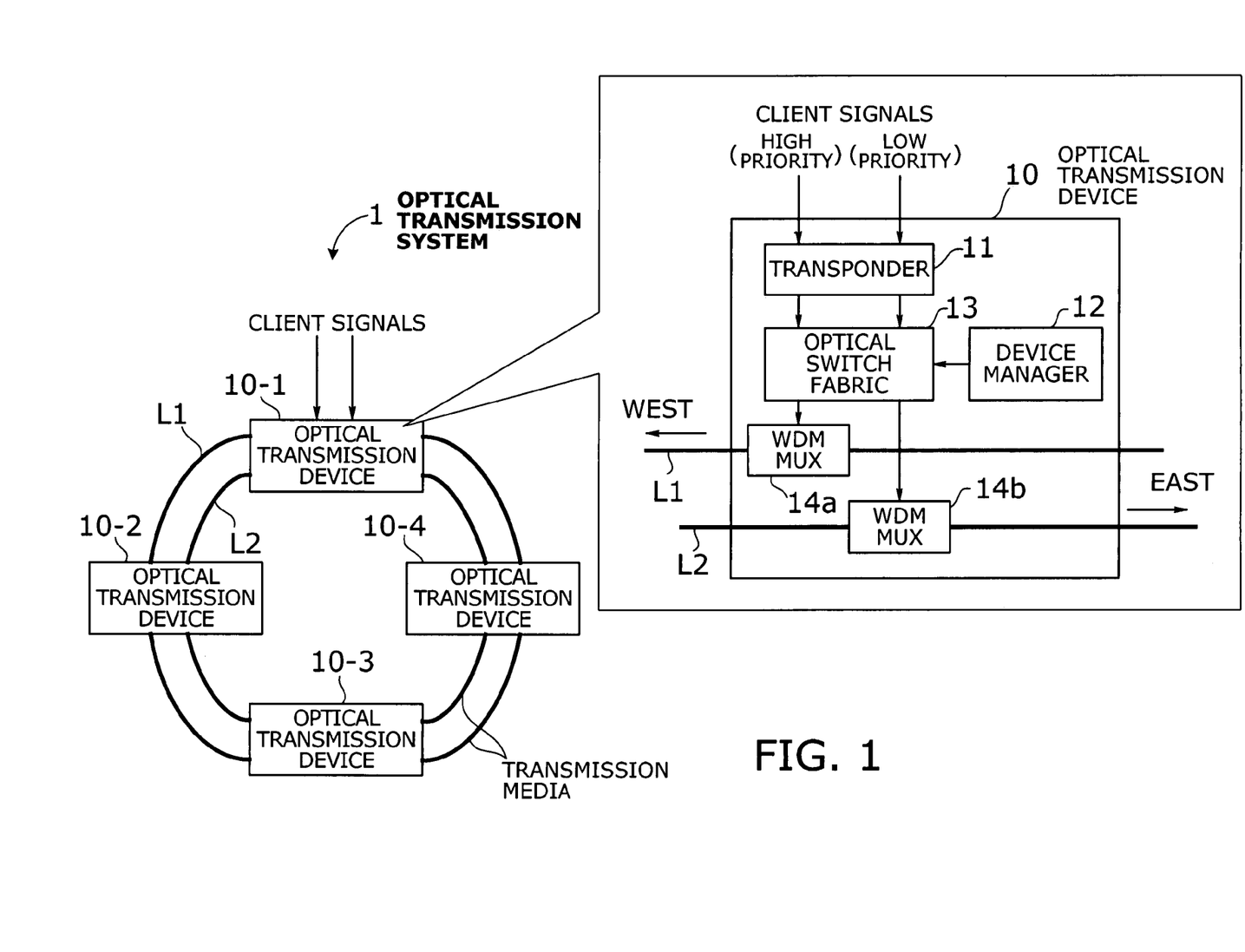
FIG. 1 is a conceptual view of an optical transmission system according to an embodiment of the present invention.

FIG. 1 is a conceptual view of an optical transmission system according to an embodiment of the present invention. The illustrated optical transmission system 1 is a WDM ring network involving a chain of four nodes 10-1 to 10-4 (collectively referred to by the reference numeral "10") connected in a dual ring topology by two fiber-optic transmission lines ("lines" for short) L1 and L2. Each optical transmission device 10 contains a transponder 11, a device manager 12, an optical switch fabric 13, and WDM multiplexers 14a and 14b. Their functions are described below.

The transponder 11 converts incoming client signals into WDM signals to be added to the network traffic on the ring. The client signals are classified into those with a high priority and those with a low priority in terms of their survivability against network failure. More specifically, the optical transmission system 1 would protect the channels for high-priority client signals, but not for low-priority signals. According to this distinction of client signals, the outcomes of the transponder 11 are divided into high-priority wavelength signals and low-priority wavelength signals.

The device manager 12 manages network failure information and lightpath information of the ring network. Those pieces of information are exchanged with peer entities in other optical transmission devices for the purposes of failure recovery and lightpath establishment.

The optical switch fabric 13 routes high-priority wavelength signals to a high-priority path and low-priority wavelength signals to a low-priority path when the network is operating normally. The high-priority path is supposed to provide a higher fault tolerance than the low-priority path. These two paths run in opposite circular directions. Suppose, for example, that one line L1 offers a high-priority path, while the other line L2 serves as a low-priority path. In this case, high-priority wavelength signals join the westbound traffic through a WDM multiplexer (WDM MUX) 14a. Low-priority wavelength signals, on the other hand, join the eastbound traffic through another WDM multiplexer 14b. The WDM multiplexers 14a and 14b combine, in the wavelength domain, the output of the optical switch fabric 13 with WDM signals sent from preceding optical transmission devices.

The optical switch fabric 13 has two protection switching modes: duplicate switching and path switchover. When a network failure occurs, the optical switch fabric 13 chooses one of these modes, depending on given failure information, as well as on the drop wavelengths at each node. In duplicate switching mode, high-priority wavelength signals are directed to both the high-priority and low-priority paths, which run in opposite directions on the ring network. In path switchover mode, the high-priority wavelength signal is directed to the low-priority path, instead of the high-priority path.

In the present example of FIG. 1, the optical switch fabric 13 in path switchover mode routes the same set of high-priority wavelength signals to both WDM multiplexers 14a and 14b, thus transmitting them in both east and west directions. That is, the duplicate switching mode permits identical signals carrying the same service data to be delivered from its high-priority and low-priority output ports to the eastbound and westbound links. Path switchover mode, on the other hand, causes the optical switch fabric 13 to route high-priority signals to the WDM multiplexer 14b. The high-priority signals, which have originally traveled westbound on the high-priority path line L1, are thus switched to the eastbound path on the line L2 which have previously been assigned to low-priority signals.

Figure 2:
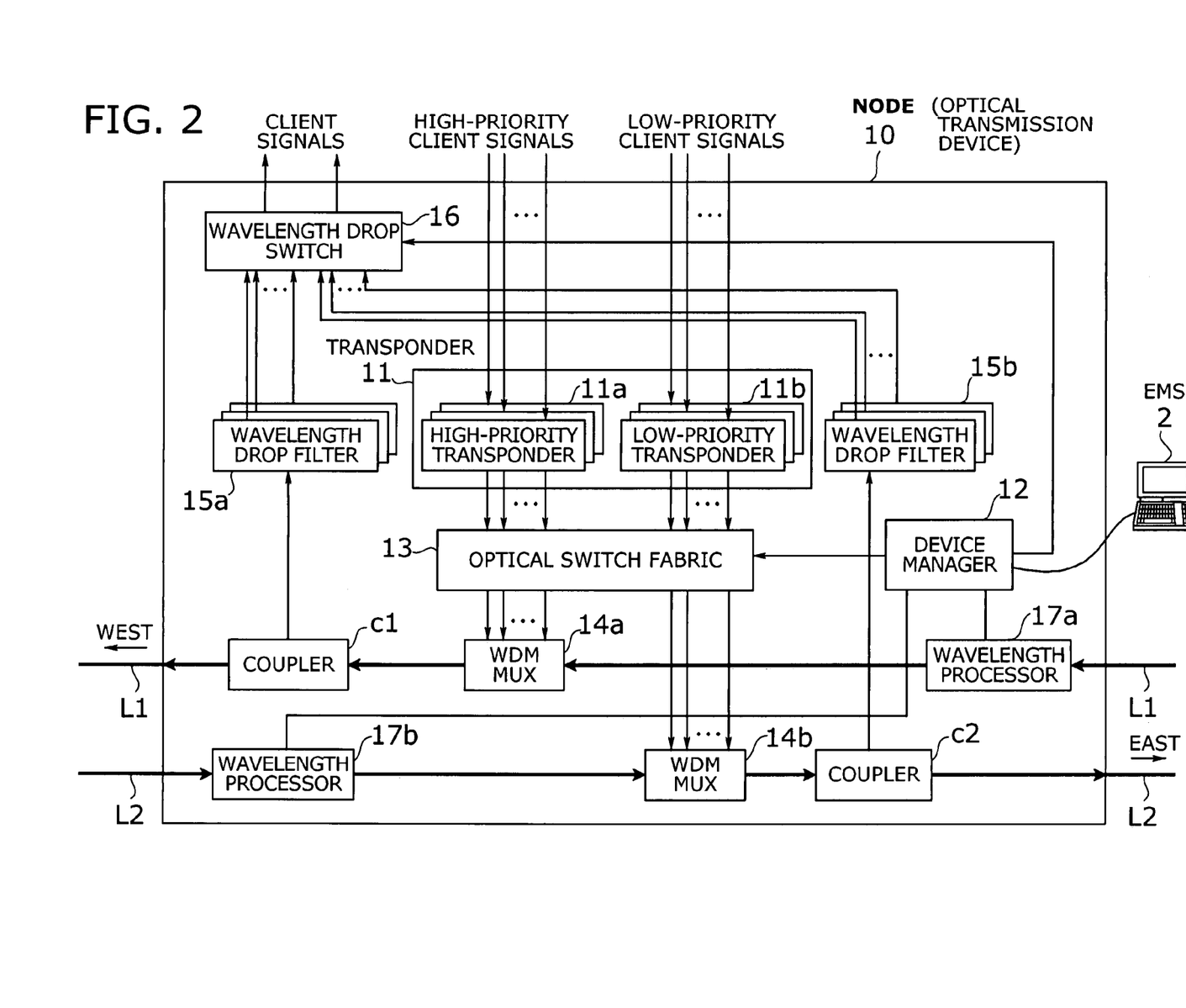
FIG. 2 shows the structure of a node.

Referring now to FIG. 2, a more detailed structure of the optical transmission device (hereafter "node") 10 will be given below. In addition to the elements described above with reference to FIG. 1, the illustrated node 10 of FIG. 2 further has the following components: wavelength drop filters 15a and 15b, a wavelength drop switch 16, wavelength processors 17a and 17b, and couplers c1 and c2. The transponder 11 actually contains a plurality of high-priority transponders 11a and low-priority transponders 11b. FIG. 2 shows a piece of equipment attached externally to the device manager 12 of the node 10. This is an element management system (EMS) 2 employed for network management purposes.

One high-priority transponder 11a is allocated for each incoming high-priority client signal in order to convert it to a particular wavelength for WDM transmission. Likewise, one low-priority transponder 11b is provided for each incoming low-priority client signal to convert it to a particular wavelength for WDM transmission. High-priority client signals are subject to failure recovery, while low-priority client signals are not.

At the couplers c1 and c2, WDM signals propagating on the ring are partly split off to corresponding wavelength drop filters 15a and 15b. Each wavelength drop filter 15a and 15b extracts a particular wavelength that should be dropped for use in a client device (not shown) coupled to this node 10. The wavelength drop switch 16 selects desired signals out of the extracted drop wavelengths, i.e., those from the westbound wavelength drop filters 15a and those from the eastbound wavelength drop filters 15b. The selected drop wavelength signals are supplied to the client device. The wavelength processors 17a and 17b have the functions of monitoring and filtering wavelengths on the westbound and eastbound rings, respectively, under the control of the device manager 12.

Normal Operation

This section describes the operation of the node 10 of FIG. 2, including the flow of signals. It is assumed first that there is no network failures. During normal operation, the westbound line L1 is used as a high-priority path, while the eastbound line L2 is used as a low-priority path.

The high-priority transponders 11a convert an incoming high-priority client signal into a high-priority wavelength signal with a wavelength of $\lambda 1$, which is referred to as a wavelength signal A. The low-priority transponders 11b, on the other hand, convert an incoming low-priority client signal into a low-priority wavelength signal with the same wavelength $\lambda 1$, which is referred to as a wavelength signal B. While having the same wavelength, these two wavelength signals A and B carry different information payloads. The information on signal A is supposed to be more important than that on signal B, and thus the failure recovery system protects only the former signal channel.

The optical switch fabric 13 routes the wavelength signal A toward the westbound WDM multiplexer 14a, so that they will merge into high-priority path traffic on the westbound line L1. Also, the optical switch fabric 13 routes the wavelength signal B toward the eastbound WDM multiplexer 14b, so that they will merge into low-priority path traffic on the eastbound line L2.

Incoming WDM signals on the westbound (counterclockwise) line L1 enter the wavelength processor 17a and go through the WDM multiplexer 14a and coupler c1. The WDM multiplexer 14a combines a new wavelength signal A with the existing WDM signals, thus providing the subsequent coupler c1 with a new set of multiplexed optical signals. The coupler c1 injects those WDM signals into the westbound fiber extending to the next node, while partly splitting them off to wavelength drop filters 15a.

Similarly to the above, incoming WDM signals on the eastbound (clockwise) line L2 enter the wavelength processor 17b and go through the WDM multiplexer 14b and coupler c2. The WDM multiplexer 14b combines a new wavelength signal B with the existing WDM signals, thus providing the subsequent coupler c2 with newly multiplexed optical signals. The coupler c2 injects those WDM signals into the eastbound fiber extending to the next node, while partly splitting them off to wavelength drop filters 15b.

The westbound wavelength processor 17a monitors wavelengths of incoming WDM signals that have arrived at the node 10 through the high-priority path. Note that a multidrop ring network allows injected wavelengths to return to the originating node, and it is thus necessary for that node to prevent such returning wavelengths from re-circulating on the ring. For this reason, the wavelength processor 17a blocks every wavelength that has been added locally in the node 10. Specifically, since the wavelength signal A has a wavelength of $\lambda 1$ in the present example, the wavelength processor 17a stops further propagation of this wavelength component $\lambda 1$ found in the received high-priority path traffic, thus preventing the same wavelength from being mixed again at the WDM multiplexer 14a that follows.

Similarly, the eastbound wavelength processor 17b monitors wavelengths of incoming WDM signals that have arrived at the node 10 through the low-priority path, and it blocks every wavelength that has been added locally in the node 10. Since in the present example, the wavelength signal B has a wavelength of $\lambda 1$, the eastbound wavelength processor 17b has to stop further propagation of this wavelength component $\lambda 1$ found in the received low-priority path traffic, thus preventing the same wavelength from being mixed again at the WDM multiplexer 14b that follows.

The couplers c1 and c2 provide the wavelength drop filters 15a and 15b with westbound and eastbound WDM signals, respectively. Each wavelength drop filter 15a and 15b extracts a particular wavelength that should be dropped for use in the attached client device (not shown). The wavelength drop switch 16 then selects desired signals out of the extracted drop wavelengths, for delivery to the client device.

Overview of Failure Recovery

Figure 6:
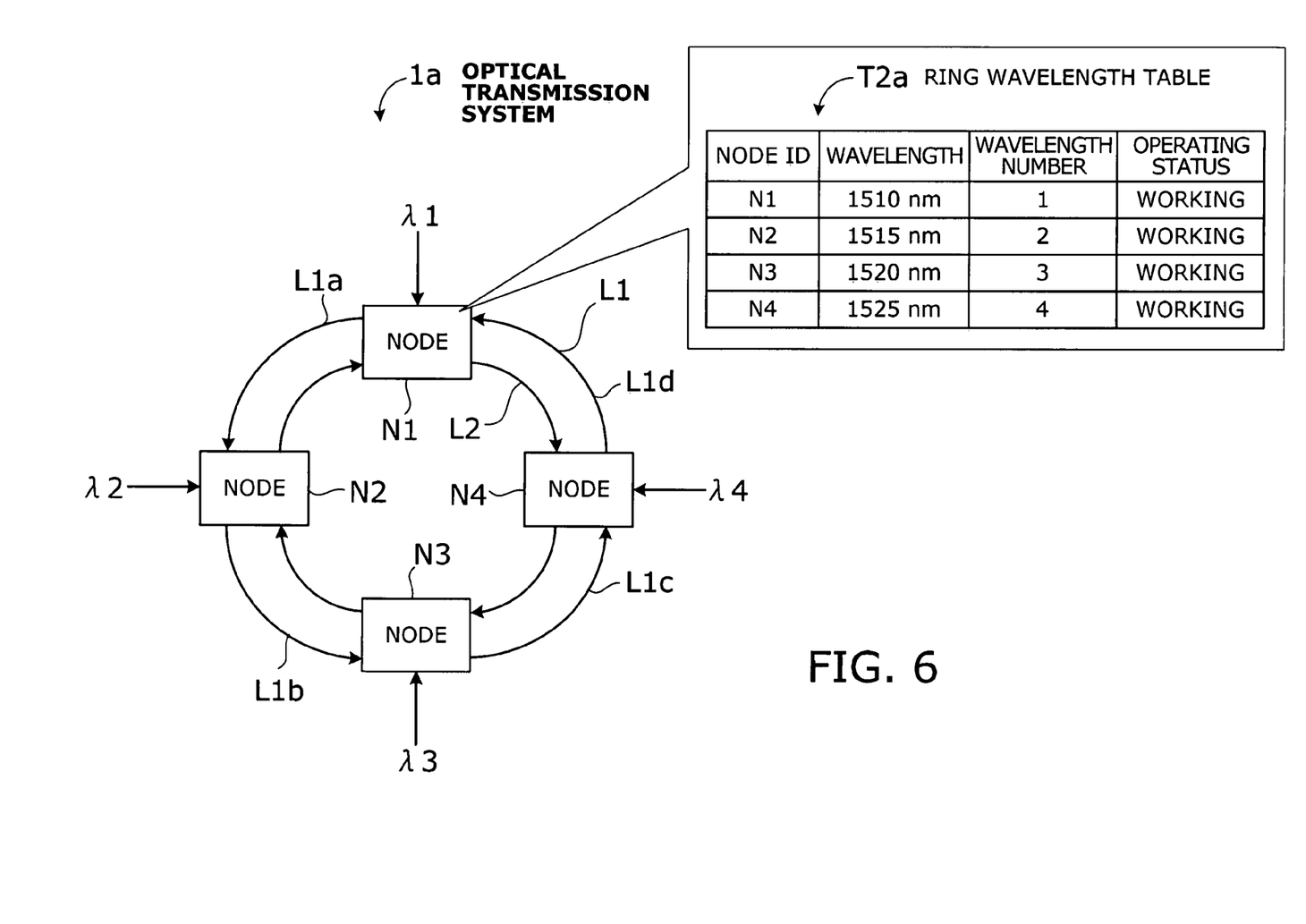
FIG. 6 shows a WDM ring system to explain a failure recovery procedure.

This section gives an overview of a protection switching process to recover from a failure in the ring network, while details of this process, including the use of various tables for switching, will be described later with reference to FIG. 6 and subsequent diagrams. The function of dropping client signals out of WDM traffic, however, will not be explained here again because, in this regard, the node 10 behaves in the same way as it does in normal situations.

Suppose now that the system of FIG. 1 encounters a link failure at a point between nodes 10-2 and 10-3 on both lines L1 and L2. Also assume that the two nodes 10-2 and 10-3 are configured at that time to drop a wavelength signal A ($\lambda 1$). This failure is detected by the device manager 12 in either the node 10-2 or node 10-3, which triggers the device manager 12 to produce a failure status message and sends it to the node 10-1 by using, for example, optical supervisory channel (OSC) facilities. Generally, OSC channel offers a data rate of 1.5 to 150 Mb/s for use in configuring and supervising a WDM network, as well as in detecting link failures. In the present system 1, incoming OSC signals are received at the wavelength processor 17a and 17b in the node 10-1 and passed to the device manager 12 for monitoring and processing.

As a result of its normal management activities, the device manager 12 in the receiving node 10-1 knows that the wavelength signal A is dropped at remote nodes 10-2 and 10-3. Also, with the failure status message received, the device manager 12 recognizes the link failure between nodes 10-2 and 10-3 on both lines L1 and L2, thus issuing a switching command to the optical switch fabric 13. According to this command, the optical switch fabric 13 performs a duplicate switching process in an attempt to recover from the detected link failure. That is, the optical switch fabric 13 stops another wavelength signal B entering the WDM multiplexer 14b, and at the same time, it allows the wavelength signal A to go to both WDM multiplexers 14a and 14b. As a result of this switching, the wavelength signal A begins flowing in both counterclockwise and clockwise directions over the lines L1 and L2. Although the other wavelength signal B is disrupted, it is no problem since the system 1 is based on the premise that the wavelength signal B is out of the scope of failure recovery.

By reconfiguring the signal paths in this way, the optical transmission system 1 of FIG. 1 will ensure that the high-priority wavelength signal A can always reach every node even if both optical transmission lines are lost at some point on the ring. Specifically in the present example, the node 10-2 can receive the signal A through line L1, and the node 10-3 through line L2, in spite the fact that both lines L1 and L2 are disrupted between the nodes 10-2 and 10-3. Those two nodes 10-2 and 10-3 can thus continue to drop the wavelength signal A just as before.

Think of another example of link failure, which occurs to the line L1 at some point between nodes 10-1 and 10-2. Also assume that the wavelength signal A ($\lambda 1$) originating at the node 10-1 is dropped at every other node 10-2 to 10-4. The link failure is detected by the device manager 12 in the node 10-1. The device manager 12 commands the optical switch fabric 13 to reconfigure itself, so that the wavelength signal A will be delivered through a different path to circumvent the failure. More specifically, the optical switch fabric 13 removes the current path of signal B to the eastbound WDM multiplexer 14b and changes the destination of signal A from the westbound WDM multiplexer 14a to the eastbound WDM multiplexer 14b, so that the wavelength signal A will flow in the clockwise direction over the eastbound line L2. While the westbound line L1 is disrupted between nodes 10-1 and 10-2, the high-priority wavelength signal A can propagate from the originating node 10-1 to other nodes 10-4, 10-3, and 10-2 in that order, along the alternative path on the eastbound line L2. This path switchover operation permits the nodes 10-2 to 10-4 to continue dropping the wavelength signal A just as before.

As mentioned earlier, conventional systems utilize only 50 percent of the available bandwidth in normal operation, since they always assign two paths to carry the same service signals in preparation for a possible link failure. According to the present invention, however, the optical transmission system 1 and its nodes 10 are designed to use a high-priority path for a particular class of service channels that are subject to failure recovery and a low-priority path for the remaining service channels that are not. Users of low-priority service channels agree with a contract stating the lack of survivability against network failure. It is therefore possible to increase the bandwidth usage up to 100 percent during normal operation. In case of failure the proposed system can recover the high-priority service channels effectively.

As can be seen from the above, the present embodiment enables a full bandwidth usage for the ring network capacity in normal situations, while providing a higher service availability by being prepared for network failure. Thus the proposed WDM ring network offers improved operability and reliability.

Wavelength Management

Figure 3:
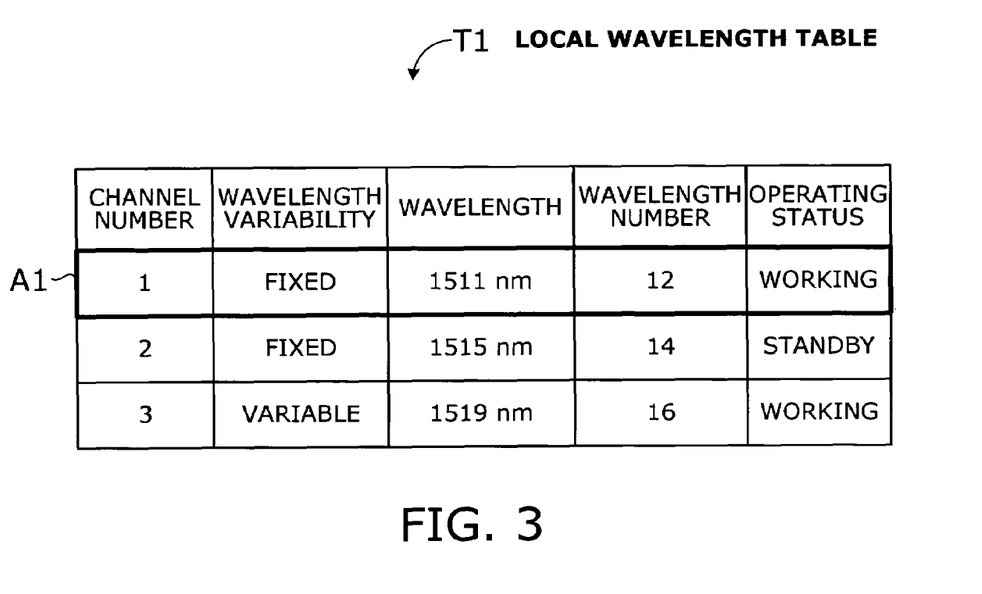
FIG. 3 shows a local wavelength table.

The device manager 12 has a local wavelength table and a ring wavelength table to manage the assignment of wavelength resources for client signals. FIG. 3 shows an example of a local wavelength table. This local wavelength table T1 has the following data fields: "Channel Number," "Wavelength Variability," "Wavelength," "Wavelength Number," and "Operating Status." The information about wavelengths to be added at the local node is registered with this table T1.

The channel number field contains the channel number of a client signal to be added. The node 10 has as many transponders as the number of client signal channels, and the local wavelength table T1 has as many entries as that. The wavelength variability field indicates how flexible the corresponding transponder is, in terms of the capability of converting a given optical signal to a desired wavelength band. This field takes a value of "Fixed" or "Variable." The value "Fixed" means that the corresponding transponder can only translate a given signal into a single wavelength band. The value "Variable" indicates that the transponder supports multiple wavelength bands. Take the first entry labeled "A1," for example. This add signal channel is currently working, with a designated channel number "1." The corresponding transponder supports a fixed wavelength of 1511 nm, which is designated by a wavelength number "12."

Figure 4:
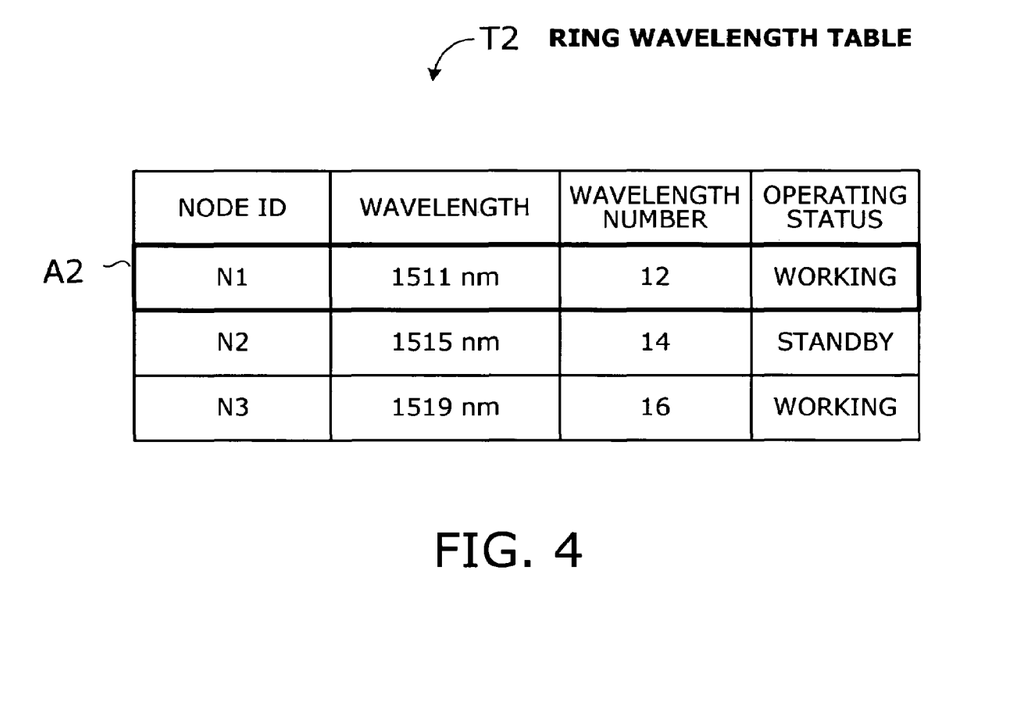
FIG. 4 shows a ring wavelength table.

FIG. 4 shows a ring wavelength table. The illustrated ring wavelength table T2 has the following data fields: "Node ID," "Wavelength," "Wavelength Number," and "Operating Status." The contents of this table T2 are actually a collection of data stored in the local wavelength table T1 of all nodes. Three different node IDs are seen in the ring wavelength table T2 of FIG. 4, meaning that there are three nodes in the ring network. For example, the first entry labeled "A2" shows that the node N1 adds a client signal with a wavelength of 1511 nm, or with a wavelength number of "12." The operating status field indicates that this signal channel is currently working. The current operating conditions and information about lightpaths are registered in this way with each node's local wavelength table T1 and ring wavelength table T2.

Lightpath Setup

This section explains how the device manager 12 sets up lightpaths. There are two methods for the device manager 12 to establish a lightpath. One is to use an EMS 2 connected to the device manager 12; the other is to use a distributed control plane and signaling message protocols.

Figure 5:
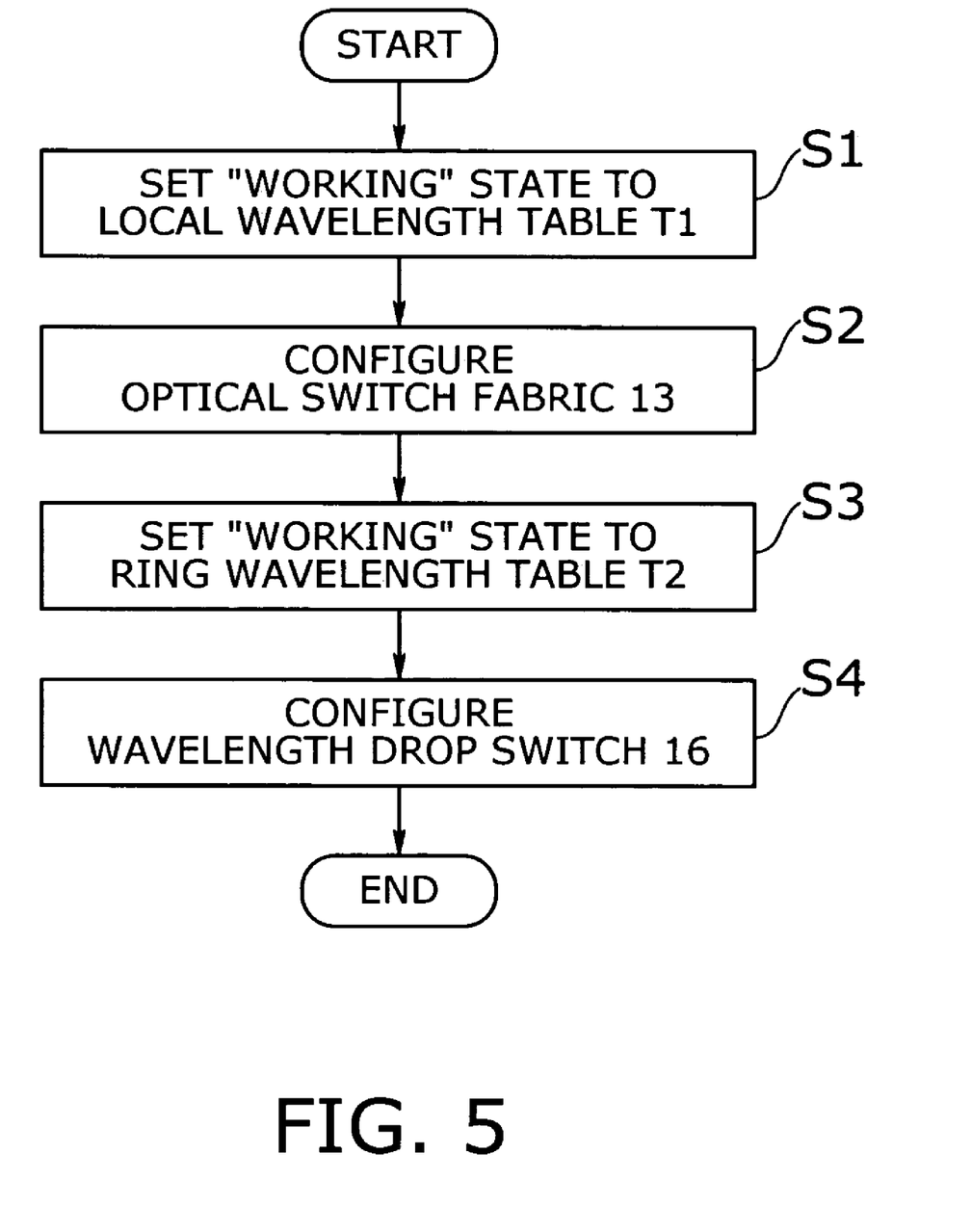
FIG. 5 is a flowchart of a lightpath setting process executed under the control of an EMS.

FIG. 5 is a flowchart of a lightpath setting process under the control of an EMS 2. Specifically, the device manager 12 performs the following steps according to commands from the EMS 2.

(S1) To establish a lightpath for a particular wavelength, the device manager 12 searches its local wavelength table T1 to find an entry corresponding to that specified wavelength. It then gives a "WORKING" state to the operating status field of that table entry.

(S2) The device manager 12 configures the optical switch fabric 13 for normal operations, such that high-priority client signals will go to a high-priority path while low-priority client signals will go to a low-priority path. Specifically, the device manager 12 directs high-priority client signals to, for example, the counterclockwise line L1, and low-priority client signals to the clockwise line L2.

(S3) Using OSC channels or other appropriate signal channel, the device manager 12 gives a "WORKING" state to the operating status field of ring wavelength table T2 in every node on the ring network.

(S4) The device manager 12 configures the wavelength drop switch 16 to drop specified channels from the ring.

Note that the above process is initiated and controlled by the EMS 2. When it is required to release an existing lightpath, the device manager 12 follows the same steps backward.

The other method for lightpath establishment uses signaling messages. The term "signaling" refers to the exchanging of messages between nodes to set up a lightpath, and how to achieve this procedure is defined in signaling protocol specifications. A distributed control plane is implemented in the device manager 12 in each network node to enable the nodes to establish lightpaths autonomously by using a signaling protocol such as the Generalized Multi-Protocol Label Switching (GMPLS).

The distributed control plane operates as follows to set up a lightpath with a particular wavelength. First, a node sends a path message to other nodes. The sending node modifies its local wavelength table T1 by giving a "WORKING" state to a table entry corresponding to the wavelength to be used. Each receiving node updates its ring wavelength table T2 with the operating status information found in the received path message, which indicates "WORKING" state of the wavelength of interest. When a node needs to drop the wavelength, that node configures its wavelength drop switch 16 accordingly.

Path messages travel along the ring, from one originating control plane entity to other distributed control plane entities. The receiving entities reserve their respective local resources, return a reserve message back to the originating entity, and configure their respective switching facilities for the new path. The originating node discards path messages that have circulated the ring.

Failure Recovery

This section describes how the proposed system recovers from a failure. FIG. 6 shows a WDM ring system for explanation of a failure recovery procedure. This optical transmission system 1a involves four nodes N1 to N4 each functioning as the optical transmission device 10 described earlier. The nodes N1 to N4 are interconnected by two lines L1 and L2 in a dual ring topology. For explanatory purposes, the first line L1 is divided into four separate links labeled L1a to L1d. L1a refers to the link between nodes N1 and N2. L1b refers to the link between nodes N2 and N3. L1c refers to the link between nodes N3 and N4. L1d refers to the link between nodes N4 and N1. In normal operation, the first line L1 goes counterclockwise to provide a high-priority path, while the second line L2 goes clockwise to provide a low-priority path.

The nodes N1 to N4 add high-priority wavelength signals with different wavelengths λ1 to λ4. The nodes N1 to N4 individually manage their own ring wavelength table T2a, which stores information about each other's current setup and operating status.

Figure 7:
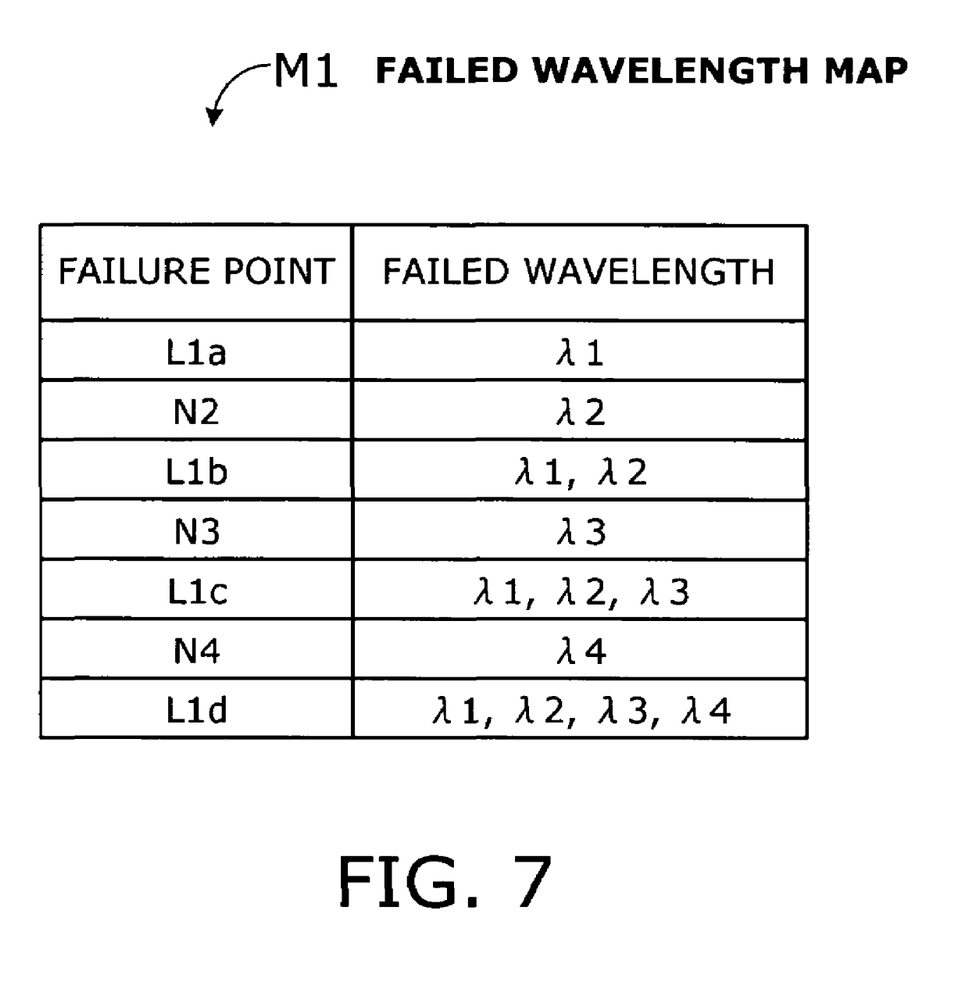
FIG. 7 shows a failed wavelength map.

FIG. 7 shows a failed wavelength map created and maintained by the device manager 12 in each node. The failed wavelength map M1 shown in FIG. 7 is of the first node N1 and has "Failure Point" and "Failed Wavelength" data fields. It is assumed here that a node failure would not disrupt the flow of existing wavelengths over the ring. In other words, WDM signals can propagate from node to node, even if an intermediate node becomes unable to add or drop its local client signals.

When the link L1a fails, the add wavelength λ1 can no longer travel from node N1 to node N2. This wavelength λ1 is thus registered as a failed wavelength in the failed wavelength map M1 of FIG. 7. When the second node N2 fails, its add wavelength λ2 cannot be added to the ring network traffic. This wavelength λ2 is thus registered with a corresponding failed wavelength field. When the link L1b fails, two add wavelengths λ1 and λ2 from nodes N1 and N2 can no longer reach node N3. Those wavelengths λ1 and λ2 are thus registered with a corresponding failed wavelength field. When the third node N3 fails, its add wavelength λ3 cannot be added to the ring network traffic. This wavelength λ3 is thus registered with a corresponding failed wavelength field. When the link L1c fails, three add wavelengths λ1 to λ3 from nodes N1 to N3 can no longer reach node N4. Those wavelengths λ1 to λ3 are thus registered with a corresponding failed wavelength field. When the fourth node N4 fails, its add wavelength λ4 cannot be added to the ring network traffic. This wavelength λ4 is thus registered with a corresponding failed wavelength field. When the link L1d fails, its add wavelength λ1 cannot return to the originating node N1. Also, the other add wavelengths λ2 to λ4 from nodes N2 to N4 can no longer reach node N1. All those wavelengths λ1 to λ4 are thus registered with a corresponding failed wavelength field.

Figure 8:
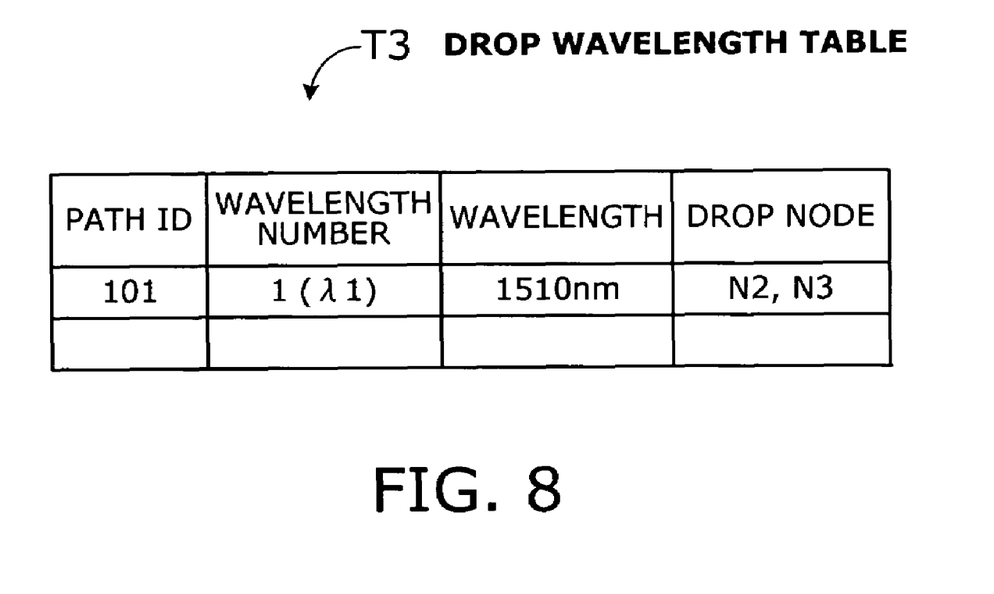
FIG. 8 shows a drop wavelength table.

FIG. 8 shows a drop wavelength table created and maintained by the device manager 12. This drop wavelength table T3 has the following data fields: "Path ID," "Wavelength Number," "Wavelength," and "Drop Node." Described in the example of FIG. 8 is a path with an identifier of "101," from which a wavelength λ1 of 1510 nm is dropped at two nodes N2 and N3.

Figure 9:
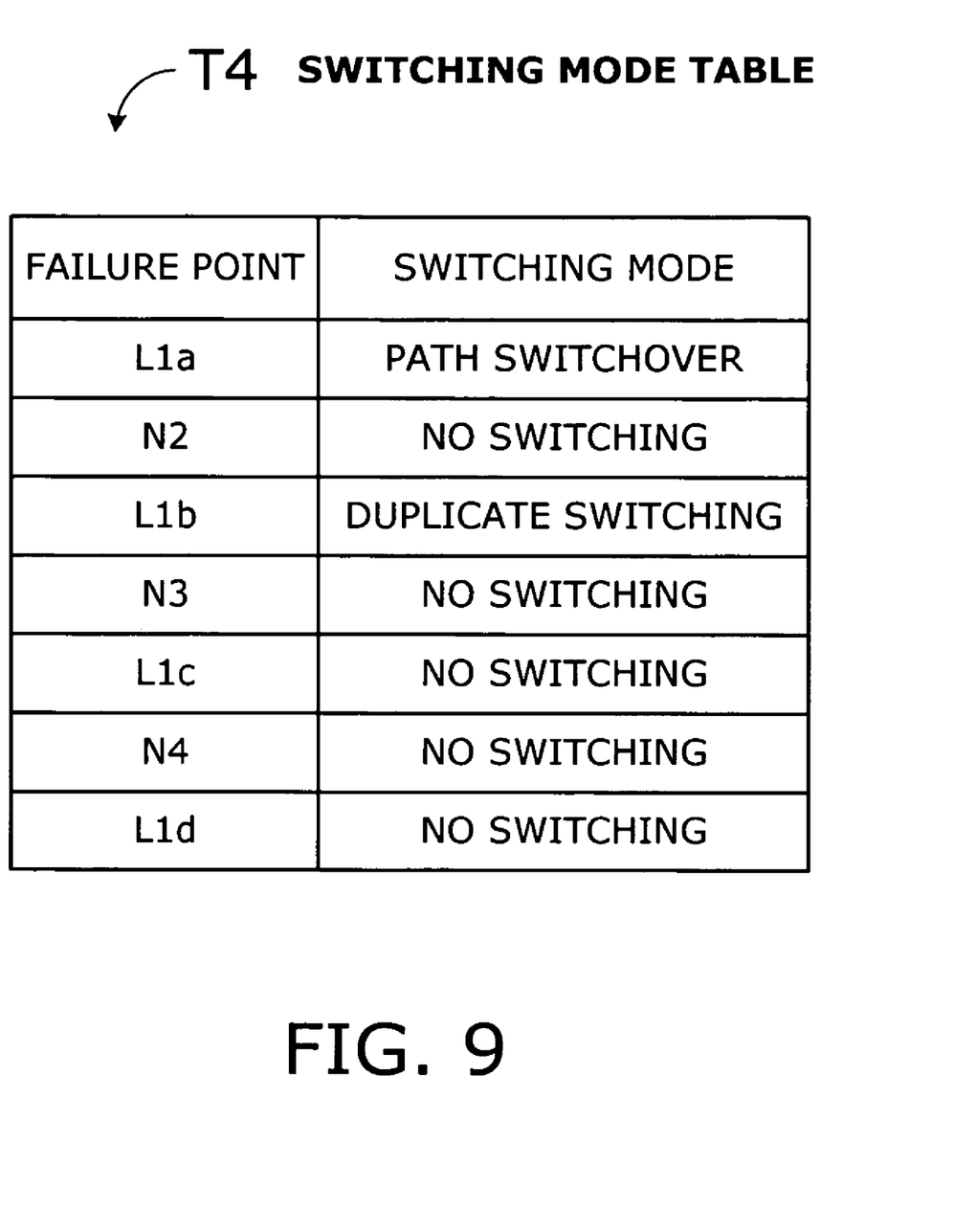
FIG. 9 shows a switching mode table.

FIG. 9 shows a switching mode table created and maintained by the device manager 12. This switching mode table T4 has "Failure Point" and "Switching Mode" data fields. With the drop wavelength table T3 of FIG. 8, the node N1 knows that wavelength λ1 is dropped at nodes N2 and N3. Based on this knowledge, the switching mode table T4 of FIG. 9 specifies how the node N1 has to treat the wavelength λ1 in case of failure.

When the link L1a fails, the optical switch fabric 13 in the first node N1 is supposed to perform a path switchover operation to route λ1 to the second line L2. This operation permits λ1 to travel clockwise on the second line L2 and reach the second node N2 and third node N3. Those nodes N2 and N3 can thus drop λ1 in spite of the L1a failure.

When the second node N2 fails, no switching operation takes place in the first node N1, since this node failure would not hamper the wavelength λ1 from reaching the dropping nodes N2 and N3.

When the link L1b fails, the optical switch fabric 13 in the first node N1 is supposed to perform a duplicate switching operation to route λ1 to both the first and second lines L1 and L2. This operation permits λ1 to travel counterclockwise on the first line L1 and reach the second node N2, as well as propagating clockwise on the second line L2 and thus reaches the third node N3. Accordingly, both nodes N2 and N3 can drop λ1 in spite of the L1b failure.

When the third node N3 fails, no switching operation takes place in the first node N1, since this node failure would not hamper the wavelength λ1 from reaching the dropping nodes N2 and N3.

When the link L1c fails, the first node does not change its optical switch fabric 13 since this failure would not hamper the wavelength λ1 from being dropped at the second and third nodes N2 and N3. The same reasoning applies to failure of node N4 and link L1d.

Another Optical Transmission System

Figure 10:
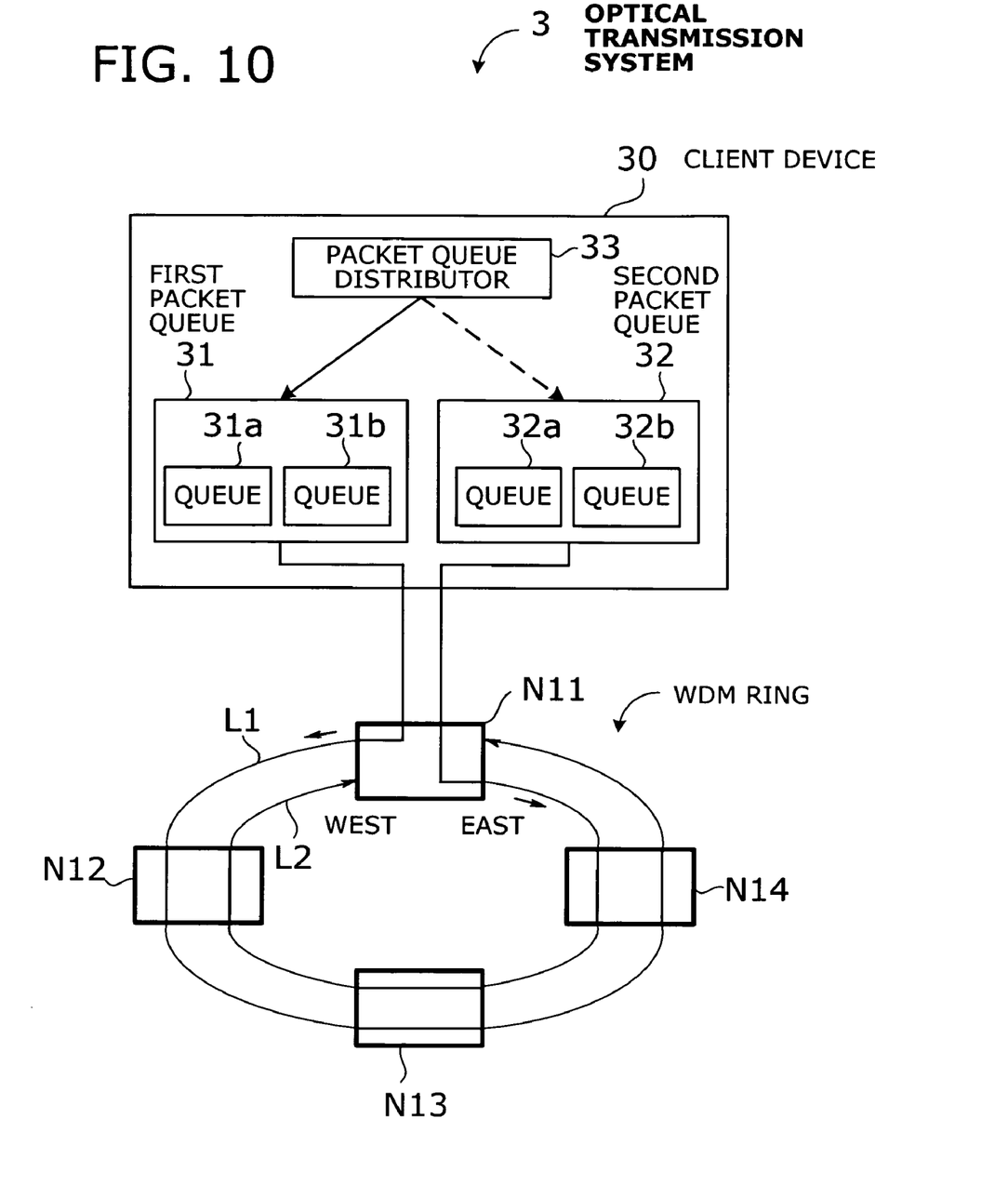
FIG. 10 shows another structure of an optical transmission system.

Referring now to FIG. 10, this section describes another type of an optical transmission system. The illustrated optical transmission system 3 involves four nodes N11 to N14 with OADM functions, which are interconnected by transmission lines L1 and L2 in a dual ring topology. Attached to the first node N11 is a client device 30, which is formed from a first packet queue 31, a second packet queue 32, and a packet queue distributor 33. The first packet queue 31, containing queues 31a and 31b, is linked to a high-priority path (line L1) via the first node N11. The second packet queue 32, containing queues 32a and 32b, is linked to a low-priority path (line L2) via the first node N11.

In normal operation, the packet queue distributor 33 routes high-priority packets to the first packet queue 31 and low-priority packets to the second packet queue 32, depending on the priority requirements for failure recovery. The first packet queue 31 stores and supplies given high-priority packets to the high-priority path on the counterclockwise line L1 via the first node N11. The first packet queue 31 has two internal queues 31a and 31b for queuing and dequeuing packets with, for example, a round robin balancing technique.

The second packet queue 32, on the other hand, stores and supplies given low-priority packets to the low-priority path on the clockwise line L2 via the first node N11. The second packet queue 32 has two internal queues 32a and 32b for queuing and dequeuing packets with, for example, a round robin balancing technique.

When the optical transmission system 3 encounters a network failure, the packet queue distributor 33 chooses either "duplicate distribution mode" or "queue switchover mode," depending on the information about the failure and the drop wavelengths at each node. Those pieces of information are delivered to the client device 30 from the serving node N11.

In duplicate distribution mode, the packet queue distributor 33 sends the same high-priority packets to both packet queues 31 and 32, thus permitting those packets to go out of the node N11 in both directions through its east and west ports. In queue switchover mode, the packet queue distributor 33 changes the destination of high-priority packets from the first packet queue 31 to the second packet queue 32. While high-priority packets have been delivered counterclockwise over the high-priority path line L1 before the failure, they are now sent out of the east port to the ex-low-priority path on the second line.

As can be seen from the above, the optical transmission system 3 of FIG. 10 chooses either duplicate distribution mode or queue switchover mode to distribute high-priority packets in case of failure. The structure of this modified system 3 achieves the same effect as that of the optical transmission system 1 described earlier in FIG. 1.

CONCLUSION

The above description of the preferred embodiments will be summarized as follows. According to the present invention, the proposed optical transmission system normally delivers high-priority wavelength signals to a high-priority path, as well as low-priority wavelength signals to a low-priority path running in an opposite direction to the high-priority path. In the event of a network failure, either duplicate switching mode or path switchover mode is chosen, depending on the information about the failure and drop wavelengths of each optical transmission device. In duplicate switching mode, high-priority wavelength signals are delivered to both the high-priority and low-priority paths, whereas, in path switchover mode, they are directed to the low-priority path, instead of the high-priority path.

Based on the above concept, the optical transmission systems 1 and 3 are designed to allow the full use of available network bandwidths in normal situations, as opposed to existing WDM ring network systems with multidrop capabilities, in which the 1+1 protection structure halves the usage of ring capacity. When a failure occurs, the system locates that failure and recovers from it by taking an appropriate protection method, thus providing improved operability and reliability.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system transporting optical signals over a ring network with wavelength-division multiplexing (WDM) techniques, the system comprising:
   (a) a plurality of optical transmission devices, each comprising:
      a transponder that converts a high-priority client signal and a low-priority client signal into a high-priority wavelength signal and a low-priority wavelength signal to be added to network traffic,
      a device manager that manages network failure information and lightpath information of the ring network, and
      an optical switch fabric that normally delivers the high-priority wavelength signal to a high-priority path and the low-priority wavelength signal to a low-priority path running in an opposite direction to the high-priority path, and when a network failure is encountered, performs protection switching in either duplicate switching mode or path switchover mode depending on the network failure information and drop wavelengths of each optical transmission device; and
   (b) transmission media interconnecting said plurality of optical transmission devices in a ring topology;
   wherein:
      the high-priority client signal, high-priority wavelength signal, and high-priority path have higher priority than the low-priority client signal, low-priority wavelength signal, and low-priority path, respectively, in terms of survivability against network failure,
      the duplicate switching mode directs the high-priority wavelength signal to both the high-priority and low-priority paths, and
      the path switchover mode directs the high-priority wavelength signal to the low-priority path, instead of the high-priority path; and
   wherein said device manager comprises:
      a failed wavelength map associating possible failure points on the ring network with wavelengths that could be disrupted as a result of failure at each stated failure point;
      a drop wavelength table describing wavelengths dropped locally at each optical transmission device; and
      a switching mode table specifying which of the duplicate switching mode and path switchover mode should be used when a network failure occurs to a wavelength described in the drop wavelength table.

2. The optical transmission system according to claim 1, wherein said device manager in each optical transmission device comprises:
   a local wavelength table for managing information about wavelengths added locally, for distribution to the other optical transmission device on the ring network; and
   a ring wavelength table for collecting wavelength information received from the other optical transmission devices.

3. The optical transmission system according to claim 1, wherein:
   said device manager in at least one optical transmission device is coupled to an external element management system that manages network operations; and
   said device manager establishes a lightpath according to commands and information from the element management system.

4. The optical transmission system according to claim 1, wherein said device manager in each optical transmission device comprises a distributed control plane entity to establish a lightpath autonomously by communicating with other distributed control plane entities using a signaling protocol.

5. The optical transmission system according to claim 4, wherein:
   a path message travels along the ring network from one originating distributed control plane entity to other distributed control plane entities;
   the receiving distributed control plane entities reserve a local resource, return a reserve message to the originating distributed control plane entity, and configure a local switching facility to set up a path; and
   the originating distributed control plane entity discards the pass message that has circulated over the ring network.

6. An optical transmission device transporting optical signals over a ring network with wavelength-division multiplexing (WDM) techniques, comprising:
   a transponder that converts a high-priority client signal and a low-priority client signal into a high-priority wavelength signal and a low-priority wavelength signal to be added to network traffic;
   a device manager that manages network failure information and lightpath information of the ring network; and
   an optical switch fabric that normally delivers the high-priority wavelength signal to a high-priority path and the low-priority wavelength signal to a low-priority path running in an opposite direction to the high-priority path, and when a network failure is encountered, performs protection switching in either duplicate switching mode or path switchover mode depending on the network failure information and drop wavelengths of each optical transmission device;

wherein:
the high-priority client signals, high-priority wavelength signals, and high-priority path have higher priority than the low-priority client signals, low-priority wavelength signals, and low-priority path, respectively, in terms of survivability against network failure,
the duplicate switching mode directs the high-priority wavelength signals to both the high-priority and low-priority paths, and
the path switchover mode directs the high-priority wavelength signals to the low-priority path, instead of the high-priority path; and
wherein said device manager comprises:
a failed wavelength map associating possible failure points on the ring network with wavelengths that could be disrupted as a result of failure at each stated failure point;
a drop wavelength table describing wavelengths dropped locally at each optical transmission device; and
a switching mode table specifying which of the duplicate switching mode and path switchover mode should be used when a network failure occurs to a wavelength described in the drop wavelength table.

7. An optical transmission system transporting optical signals over a ring network with wavelength-division multiplexing (WDM) techniques, the system comprising:
  (a) a plurality of optical transmission devices with optical add/drop multiplexing functions;
  (b) transmission media interconnecting said plurality of optical transmission devices in a ring topology; and
  (c) a client device served by one of said plurality of optical transmission devices, the client device comprising:
  a first packet queue that supplies packets to a high-priority path on said transmission media through the serving optical transmission device;
  a second packet queue that supplies packets to a low-priority path on said transmission media through the serving optical transmission device; and
  a packet queue distributor that normally distributes incoming high-priority packets to said first packet queue and incoming low-priority packets to said second packet queue, and when a network failure is encountered, chooses either duplicate distribution mode or queue switchover mode, depending on a failure point identified from network failure information, as well as depending on drop wavelengths of each optical transmission device;
wherein:
the incoming high-priority packets and high-priority path have higher priority than the incoming low-priority packets and low-priority path, respectively, in terms of survivability against network failure,
the duplicate distribution mode directs the incoming high-priority packets to both said first and second queues, and
the queue switchover mode directs the incoming high-priority packets to said second queue, instead of said first queue; and
wherein said packet queue distributor comprises:
a failed wavelength map associating possible failure points on the ring network with wavelengths that could be disrupted as a result of failure at each stated failure point;
a drop wavelength table describing wavelengths dropped locally at each optical transmission device; and
a switching mode table specifying which of the duplicate switching mode and path switchover mode should be used when a network failure occurs to a wavelength described in the drop wavelength table.

8. A client device linked to an optical wavelength-division multiplexed transmission system in which a plurality of optical transmission devices with optical add/drop multiplexing functions are interconnected by transmission media in a ring topology, the client device comprising:
  a first packet queue that supplies packets to a high-priority path on the transmission media through one of the optical transmission devices that serves the client device;
  a second packet queue that supplies packets to a low-priority path on the transmission media through the serving optical transmission device; and
  a packet queue distributor that normally distributes incoming high-priority packets to said first packet queue and incoming low-priority packets to said second packet queue, and when a network failure is encountered, chooses either duplicate distribution mode or queue switchover mode, depending on a failure point identified by network failure information, as well as depending on drop wavelengths of each optical transmission device;
wherein:
the incoming high-priority packets and high-priority path have higher priority than the incoming low-priority packets and low-priority path, respectively, in terms of survivability against network failure,
the duplicate distribution mode directs the incoming high-priority packets to both said first and second queues, and
the queue switchover mode directs the incoming high-priority packets to said second queue, instead of said first queue; and
wherein said packet queue distributor comprises:
a failed wavelength map associating possible failure points on the ring network with wavelengths that could be disrupted as a result of failure at each stated failure point;
a drop wavelength table describing wavelengths dropped locally at each optical transmission device; and
a switching mode table specifying which of the duplicate switching mode and path switchover mode should be used when a network failure occurs to a wavelength described in the drop wavelength table.

* * * * *